(12) United States Patent
Kim et al.

(10) Patent No.: US 9,598,006 B2
(45) Date of Patent: Mar. 21, 2017

(54) APPARATUS AND METHOD FOR CONTROLLING TURN SIGNAL

(71) Applicants: HYUNDAI MOTOR COMPANY, Seoul (KR); KIA MOTORS CORPORATION, Seoul (KR); DAESUNG ELECTRIC CO., LTD., Ansan-si, Gyeonggi-do (KR)

(72) Inventors: Sung Eun Kim, Seoul (KR); Bong Gi Song, Suwon-Si (KR); Seag Woo Lee, Gunpo-Si (KR)

(73) Assignees: HYUNDAI MOTOR COMPANY, Seoul (KR); KIA MOTORS CORPORATION, Seoul (KR); DAESUNG ELECTRIC CO., LTD., Ansan-si, Gyeonggi-do (KR)

( * ) Notice: Subject to any disclaimer, the term of this patent is extended or adjusted under 35 U.S.C. 154(b) by 0 days.

(21) Appl. No.: 14/670,387

(22) Filed: Mar. 26, 2015

(65) Prior Publication Data

US 2016/0114722 A1    Apr. 28, 2016

(30) Foreign Application Priority Data

Oct. 22, 2014  (KR) .......................... 10-2014-0143036

(51) Int. Cl.
*B60Q 1/34* (2006.01)
*B60Q 1/42* (2006.01)
(Continued)

(52) U.S. Cl.
CPC .............. *B60Q 1/346* (2013.01); *B60Q 1/40* (2013.01); *B60Q 1/42* (2013.01); *B60Q 1/46* (2013.01); *B60Q 1/52* (2013.01)

(58) Field of Classification Search
CPC . B60Q 1/34; B60Q 1/346; B60Q 1/40; B60Q 1/42; B60Q 1/52; B60Q 1/54; B60Q 1/0076; B60Q 1/0088; B60Q 1/0094
See application file for complete search history.

(56) References Cited

U.S. PATENT DOCUMENTS 3,809,833 A * 5/1974 Miller .................... B60Q 1/425
200/565
3,858,176 A * 12/1974 Miller .................... B60Q 1/425
200/61.27
(Continued)

FOREIGN PATENT DOCUMENTS

JP    GB 2351192 A * 12/2000 ............... B60Q 1/38
JP    2004-142562 A    5/2004
(Continued)

OTHER PUBLICATIONS

Korean Office Action dated Oct. 5, 2015 issued in Korean Patent Application No. 10-2014-0143036.

*Primary Examiner* — Adam Tissot
*Assistant Examiner* — Tamara Weber
(74) *Attorney, Agent, or Firm* — McDermott Will & Emery LLP

(57) ABSTRACT

An apparatus for controlling a turn signal includes a turn signal switch configured to include at least one of operation modes of a lane change mode and a turn mode. A steering angle sensor is configured to detect a steering angle of a vehicle. A controller is configured to control the turn signal switch to turn on and off a turn signal lamp according to an operation mode and to turn off the turn signal lamp in at least one of a case in which the steering angle, which returns in a reverse direction to a course change direction detected by the steering angle sensor, reaches a preset angle and a case in which an operation time of the turn signal switch exceeds a preset time.

9 Claims, 3 Drawing Sheets

(51) Int. Cl.
*B60Q 1/52* (2006.01)
*B60Q 1/40* (2006.01)
*B60Q 1/46* (2006.01)

(56) References Cited

U.S. PATENT DOCUMENTS

| | | | | |
|---|---|---|---|---|
| 4,293,743 | A * | 10/1981 | Iwata | B60Q 1/1469 200/4 |
| 5,581,235 | A * | 12/1996 | Hollstein | B60Q 1/40 340/475 |
| 5,872,511 | A * | 2/1999 | Ohkuma | B60Q 1/46 200/61.27 |
| 6,023,221 | A * | 2/2000 | Michelotti | B60Q 1/52 340/463 |
| 6,333,687 | B1 * | 12/2001 | LaBelle | B60Q 1/54 340/463 |
| 7,397,349 | B2 * | 7/2008 | Lahr | B60Q 1/50 307/9.1 |
| 2004/0100373 | A1 * | 5/2004 | Ponziani | B60Q 1/40 340/476 |
| 2010/0156621 | A1 * | 6/2010 | Nishimura | B60Q 1/42 340/476 |
| 2013/0268162 | A1 * | 10/2013 | Ponziani | B60W 30/00 701/48 |
| 2016/0016508 | A1 * | 1/2016 | Hoskins | B60Q 1/343 340/476 |

FOREIGN PATENT DOCUMENTS

| | | |
|---|---|---|
| JP | 2009-248576 A | 10/2009 |
| JP | 2010-018185 A | 1/2010 |
| JP | 2010-018245 A | 1/2010 |
| JP | 2011-131631 A | 7/2011 |
| KR | 20-1998-0032957 U | 9/1998 |
| KR | 10-2002-0014305 A | 2/2002 |
| KR | 10-0451993 B1 | 10/2004 |
| KR | 10-2006-0096248 A | 9/2006 |
| KR | 10-2011-0048808 A | 5/2011 |
| KR | 10-2012-0010307 A | 2/2012 |

* cited by examiner

| OPERATION MODE | DETAILED OPERATION | CONTACT SIGNAL |
|---|---|---|
| LANE CHANGE MODE | ① RELEASE |  |
| | ② HOLDING |  |
| TURN MODE | ③ RELEASE |  |
| | ④ HOLDING |  |
| ② → TURN MODE | RELEASE |  |
| | HOLDING |  |
| ② | RELEASE |  |
| ④ | RELEASE |  |

APPARATUS AND METHOD FOR CONTROLLING TURN SIGNAL

CROSS-REFERENCE(S) TO RELATED APPLICATIONS

The present application claims the benefit of priority to Korean Patent Application Number 10-2014-0143036 filed in the Korean Intellectual Property Office on Oct. 22, 2014, the entire contents of which application are incorporated herein for all purposes by this reference.

TECHNICAL FIELD

The present disclosure relate to an apparatus for electronically controlling a turn signal and method for the same.

BACKGROUND

A turn signal switch apparatus is provided at a driver's seat of a vehicle to be operated by an operation lever in a housing which is mounted at a steering column. The turn signal switch apparatus can turn on and off a left turn indication lamp or a right turn indication lamp by rotating the operation lever from a neutral position to a left turn indication position or a right turn indication position.

A cam surface is formed within the housing and a driving body driven by the rotation of the operation lever slides on the cam surface to guide a rotation direction of the operation lever. Further, the operation lever is latched at the left turn indication position or the right turn indication position, and the turn signal switch apparatus has a canceling mechanism which rotates a handle in an indicated direction and then rotates the handle in a reverse direction to automatically return the left turn indication position or the right turn indication position to the neutral position.

According to the related art, a turn signal is mechanically canceled by using a canceling cam as the turn signal automatic canceling mechanism. However, the canceling mechanism rotates a steering wheel at a steering angle of the steering wheel which is predefined and then automatically returns the turn signal switch when the steering wheel is released. Thus, when a driver rotates the steering wheel at the predefined angle of the steering wheel or less, the turn signal switch may not automatically return, and therefore, the driver needs to manually operate the steering wheel in order to return the steering wheel to the neutral position.

Further, when the mechanical canceling mechanism uses the canceling cam, the overall size of a canceling cam assembly needs to be changed according to an outer diameter of a steering column shaft.

The matters described as the related art have been provided only for assisting in the understanding for the background of the present disclosure and should not be considered as corresponding to the related art already known to those skilled in the art.

SUMMARY

An aspect of the present inventive concept is directed to an apparatus for controlling a turn signal capable of electronically and automatically canceling a turn signal using angle information of a steering angle sensor and operation time of a turn signal switch, and a method for the same.

Other objects and advantages of the present inventive concept can be understood by the following description, and become apparent with reference to the embodiments of the present inventive concept. Also, it is obvious to those skilled in the art to which the present disclosure pertains that the objects and advantages of the present invention can be realized by the means as claimed and combinations thereof.

In accordance with an embodiment of the present inventive concept, an apparatus for controlling a turn signal includes a turn signal switch configured to include at least one of operation modes of a lane change mode and a turn mode. A steering angle sensor is configured to detect a steering angle of a vehicle. A controller is configured to control the turn signal switch to turn on and off a turn signal lamp according to an operation mode and to turn off the turn signal lamp in at least one of a case in which the steering angle, which returns in a reverse direction to a course change direction detected by the steering angle sensor, reaches a preset angle and a case in which an operation time of the turn signal switch exceeds a preset time.

The controller may determine the operation mode based on contact signals generated when the turn signal switch passes through a plurality of contacts.

The controller may determine the operation mode as any one of the lane change mode and the turn mode depending on directions of initial edges of the contact signals and the number of edges of the contact signals.

When the operation mode is the lane change mode, the controller may turn off the turn signal lamp after the first time elapses.

The controller may be configured to determine the course change direction when the operation mode is the turn mode.

The controller may be configured to determine whether steering is operated in the reverse direction to the course change direction.

The controller may be configured to determine whether the detected steering angle of the steering angle sensor is equal to or more than a preset angle when the steering is operated in the reverse direction, and turn off the turn signal lamp when the detected steering angle is equal to or more than the preset angle.

The controller may be configured to determine whether a variation of the steering angle for a second time is changed to a first reference value or more when the steering is operated in the reverse direction and turn off the turn signal lamp when the variation of the steering angle is equal to or more than the first reference value.

The controller may be configured to determine whether the operation time of the turn signal switch exceeds a third time and turn off the turn signal lamp when the operation time of the turn signal switch exceeds the third time.

The controller may be configured to determine whether a variation of a vehicle speed for a fourth time is equal to or more than a second reference value and turn on an emergency light when the variation of the vehicle speed is equal to or more than the second reference value.

The controller may be configured to determine whether a vehicle speed is equal to or less than a preset speed limit of a driving road and turn on an emergency light if it is determined that the vehicle speed is equal to or less than the speed limit, in which the speed limit of the driving road may be based on information from a navigator.

In accordance with another embodiment of the present inventive concept, a method for controlling a turn signal, comprising determining, by a controller, an operation mode of a turn signal switch. Whether the operation mode is a lane change mode or a turn mode is determined based on a contact signal when the turn signal switch passes through a plurality of contacts. A course change direction is determined when the operation mode is the turn mode. Whether steering is operated in a reverse direction to the course change direction is determined. Whether a steering angle detected by a steering angle sensor is equal to or more than a preset angle is determined when the steering is operated in the reverse direction. A turn signal lamp is turned off.

DETAILED DESCRIPTION

Figure 1:
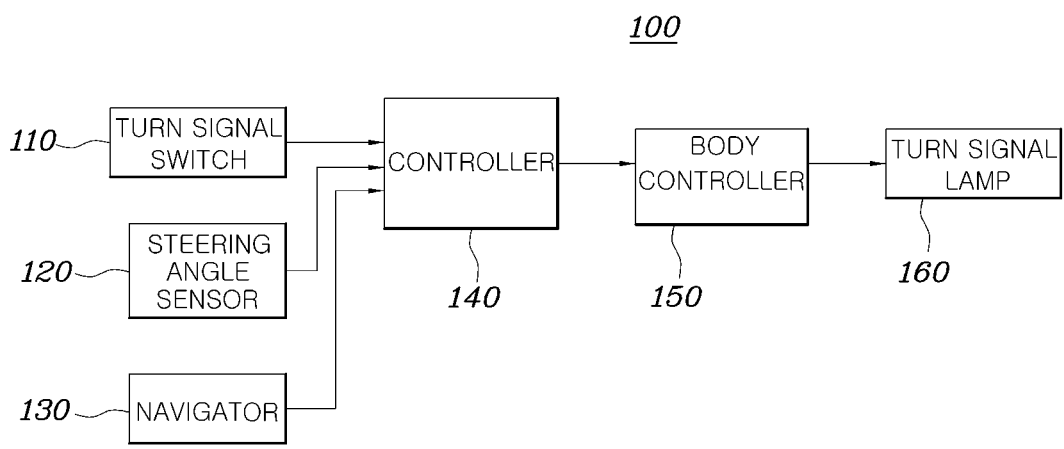
FIG. 1 is a block diagram illustrating an apparatus for controlling a turn signal according to an exemplary embodiment of the present inventive concept.

Hereinafter, an apparatus for controlling a turn signal according to exemplary embodiments of the present inventive concept will be described with reference to the accompanying drawings. FIG. 1 is a block diagram illustrating an apparatus for controlling a turn signal according to an exemplary embodiment of the present inventive concept, FIG. 2 is a diagram illustrating an operation of the turn signal switch according to the exemplary embodiment of the present inventive concept, and FIG. 3 is a table illustrating operation modes of the turn signal switch according to the exemplary embodiment of the present inventive concept and contact signals depending on operation modes.

Figure 2:
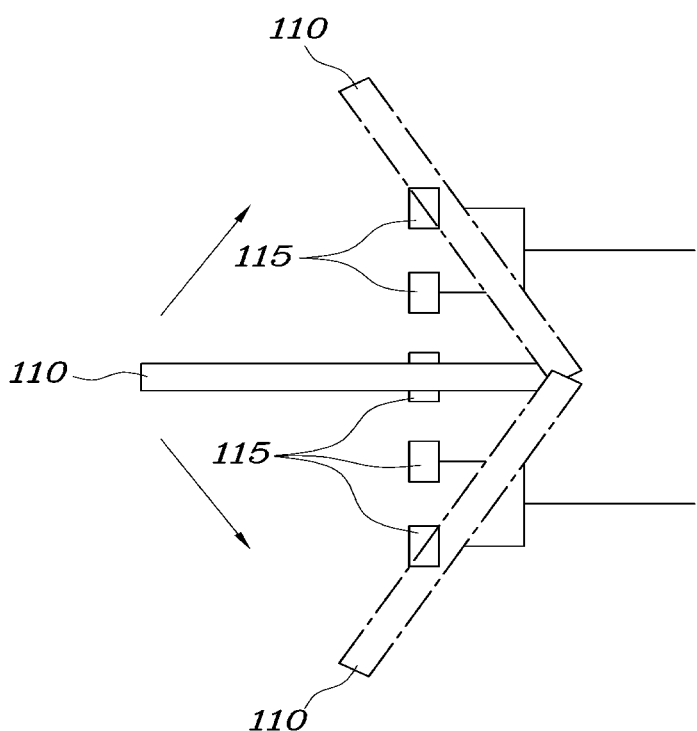
FIG. 2 is a diagram illustrating an operation of the turn signal switch according to the exemplary embodiment of the present inventive concept.
Figure 3:
FIG. 3 is a table illustrating operation modes of the turn signal switch according to the exemplary embodiment of the present inventive concept and contact signals depending on operation modes.
Figure 3:
Figure 3:
Figure 3:
Figure 3:
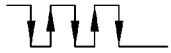
Figure 3:
Figure 3:
Figure 3:

Referring to FIGS. 1 to 3, an apparatus 100 for controlling a turn signal may include a turn signal switch 110 configured to include at least one of operation modes of a lane change mode and a turn mode. A steering angle sensor 120 is configured to detect a steering angle of a vehicle. A controller 140 is configured to control the turn signal switch 110 to turn on and off a turn signal lamp 160 depending on an operation mode and to turn off the turn signal lamp 160 in at least one of a case in which the steering angle returning in a reverse direction to a course change direction detected by the steering angle sensor 120 reaches a preset angle and a case in which an operation time of the turn signal switch 110 exceeds a preset time.

For example, the lane change mode of the turn signal switch 110 is set by performing a first angle operation on the turn signal switch 110 in a left rotation or right rotation operation direction. Further, the turn mode of the turn signal switch 110 is set by performing a second angle operation on the turn signal switch 110 in the left rotation or right rotation operation direction. Here, a second angle of the turn signal switch 110 in the turn mode may be set to be larger than a first angle of the turn signal switch 110 in the lane change mode.

The controller 140 may determine the operation mode according to contact signals generated when the turn signal switch 110 passes through a plurality of contacts 115 and may determine the operation mode as at least any one of the lane change mode and the turn mode based on directions of initial edges of the contact signals and the number of edges of the contact signals.

In detail, as illustrated in FIG. 2, the plurality of contacts 115 are provided at one side of the turn signal switch 110. Here, the controller 140 may receive a contact signal when the turn signal switch 110 enters any one of the contacts 115 and may not receive the contact signals when the turn signal switch 110 deviates from the contacts 115. When the contact signal is not input initially and is then input, a rising edge is generated, and when the contact signal is input initially and is then not input, a falling edge is generated. A contact signal is not input from a middle contact among the plurality of contacts 115.

As illustrated in FIG. 3, when the turn signal switch 110 is present at a neutral mode and is then operated in a left or right rotation direction lane change mode, the turn signal switch 110 is positioned at one contact and then returns, and therefore, one or two contact signal edges are generated. On the other hand, when the turn signal switch 110 is positioned at the neutral mode and is then operated in a left or right rotation direction turn mode, the turn signal switch 110 passes through the plurality of contacts 115 and then returns, and therefore, at least three contact signal edges are generated. Therefore, when the turn signal switch 110 is positioned at the neutral mode and is then operated, the controller 140 may determine at least any one of the operation modes of the lane change mode and the turn mode based on the number of edges of the contact signals.

Further, when the turn signal switch 110 is operated as the lane change mode and then is operated as the turn mode in a corresponding course change direction, one rising edge contact signal is generated, and then, two or five contact signal edges are additionally generated. On the other hand, when the turn signal switch 110 is operated as the lane change mode and returns to the neutral mode, one rising edge contact signal is generated, and then, one falling edge contact signal is additionally generated. Further, when the turn signal switch 110 is operated as the turn mode and returns to the neutral mode, three edge contact signals are generated and then three contact signals are additionally generated. In this case, the initial edge of the contact signal additionally generated is the falling edge. Therefore, the controller 140 may determine the operation mode of the turn signal switch 110 based on the number of edges of the contact signals which are additionally generated even when the initial edge of the contact signal is the falling edge.

When the operation mode is the lane change mode, the controller 140 may turn off the turn signal lamp 160 after a first time elapses. That is, the controller 140 turns on and then turns off the turn signal lamp 160 for a predetermined time when the turn signal switch 110 is operated as the lane change mode.

Here, the controller 140 may be provided to use a body controller 150 to output the turn on and off signals of the turn signal lamp 160.

When the operation mode is the turn mode, the controller 140 may perform a first step of determining the course change direction and may perform a second step of determining whether steering is operated in a reverse direction to the course change direction.

The controller 140 determines through which of the plurality of contacts 115 the turn signal switch 110 passes to be able to determine a course direction to which a driver wants to change.

When the steering is operated in the reverse direction as determination result of the steering, the controller 140 determines whether a sensing value of the steering angle sensor 120 is equal to or more than a preset angle. If it is determined that the sensing value is equal to or more than the preset angle, the controller 140 may turn off the turn signal lamp 160.

For example, the controller 140 determines the steering operation in a right direction when the course change direction is left and receives the sensing value from the steering angle sensor 120 to determine whether the steering is steered at the preset angle or more. When the sensing value is equal to or more than the preset angle, the turn signal lamp 160 is turned off by determining that the rotation of the vehicle is completed. On the other hand, when the sensing value is equal to or less than the preset angle, the turn signal lamp 160 is not turned off by determining that the rotation of the vehicle is not completed. The controller 140 may perform the electronic turn signal control by determining the steering operation angle in the left direction when the course change direction is right.

Further, when the steering is operated in the reverse direction according to a determination result, the controller 140 may determine whether variation of the sensing value of the steering angle sensor 120 for a second time is changed to a first reference value or more.

That is, the controller 140 turns off the turn signal lamp 160 when the steering angle of the steering is suddenly changed in the reverse direction to the course change direction within a predetermined time.

Further, after the step of determining whether the steering is operated in the reverse direction, the controller 140 may determine whether the operation time of the turn signal switch 110 exceeds a third time. The controller 140 may turn off the turn signal lamp 160 if it is determined that the operation time of the turn signal switch 110 exceeds the third time.

According to the exemplary embodiment of the present inventive concept, when rotation of the vehicle is not completed for a predetermined time and steering is performed in a reverse direction to a course change direction as much as the preset angle, the turn signal lamp 160 is turned off by determining that a turn time expires. Therefore, it is possible to prevent the turn signal lamp 160 from being turned on at all times by operating the turning signal switch 110 while the rotation of the vehicle is not performed. That is, the vehicle is prevented from being discharged due to the turn signal lamp 160.

The controller 140 may determine whether a variation of a vehicle speed for a fourth time is equal to or more than a second reference value and turn on an emergency light according to the variation of the vehicle speed.

Here, the variation of the vehicle speed is a value obtained by subtracting a current vehicle speed from a vehicle speed prior to a preset time, and it may be appreciated that as the variation of the vehicle speed is large, the vehicle speed of the vehicle is suddenly reduced. In this case, the controller 140 turns on the emergency light by determining that the variation of the vehicle speed is equal to or more than a preset reference value as an emergency situation in which emergency braking occurs. Therefore, the driver needs not directly operate the emergency light at the time of the emergency situation.

In addition, the controller 140 may determine whether the vehicle speed is equal to or less than a preset speed limit of a driving road and turn on the emergency light depending on the vehicle speed in which the speed limit of the driving road is based on information from a navigator 130.

The controller 140 receives the speed limit of the driving road from the navigator 130, in which the received speed limit may be set to be smaller than the actual speed limit of the driving road. Therefore, when the vehicle speed is smaller than the preset speed limit determined as a risk situation on an express highway on which the vehicle is driving, the controller 140 may turn on the turn signal lamps 160 at both sides thereof, i.e., the emergency light to effectively display the risk situation to outside without manual operation of the driver.

Figure 4:
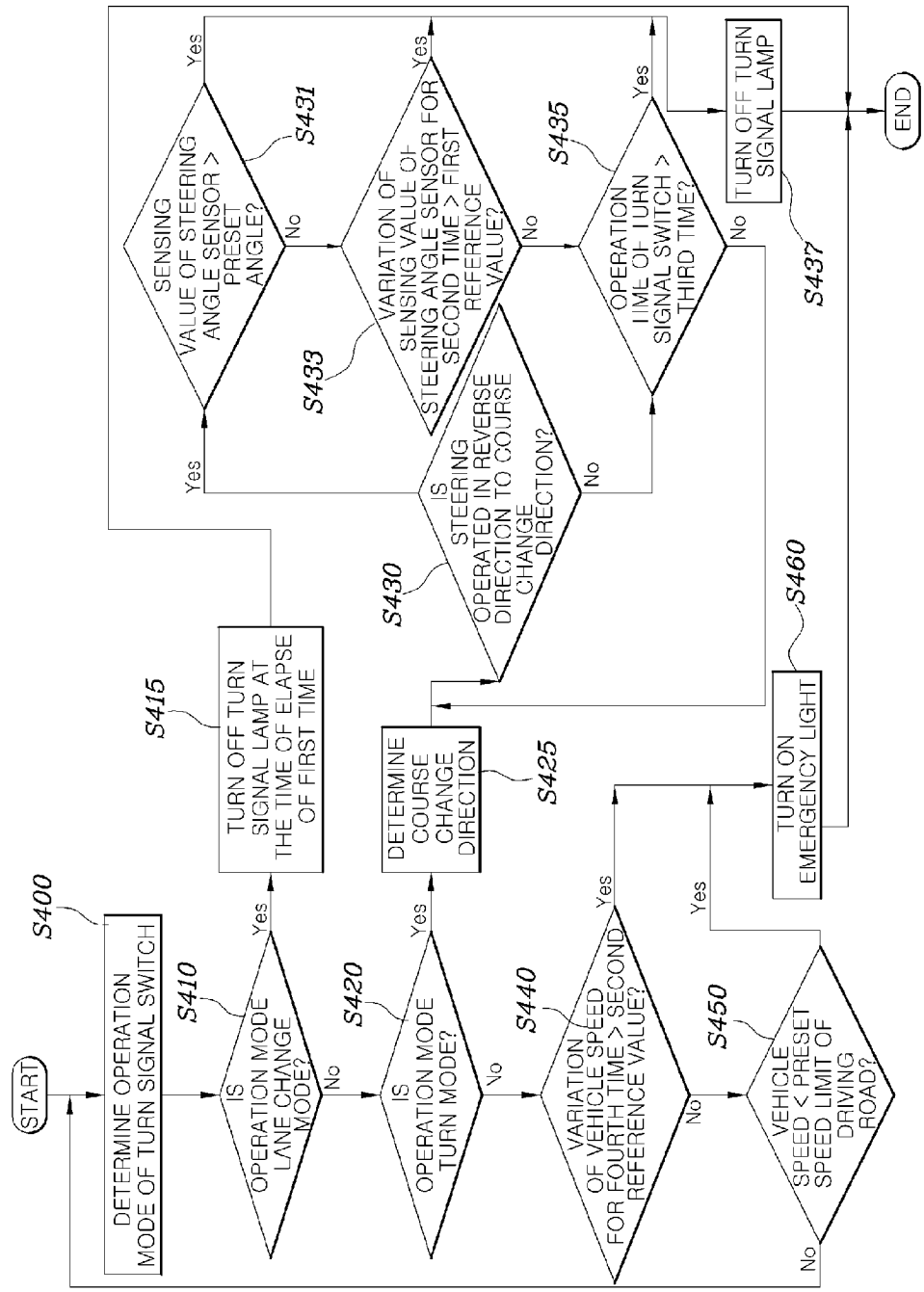
FIG. 4 is a flow chart illustrating a method for controlling a turn signal according to an exemplary embodiment of the present inventive concept.

Hereinafter, a method for controlling a turn signal according to exemplary embodiments of the present inventive concept will be described with reference to the accompanying drawings. FIG. 4 is a flow chart illustrating a method for controlling a turn signal according to an exemplary embodiment of the present inventive concept.

Referring to FIG. 4, the method for controlling a turn signal may include determining an operation mode of a turn signal switch (S400). A turn signal lamp is turned off in at least one of the case in which a steering angle returning in a reverse direction to a course change direction detected by a steering angle sensor reaches a preset angle or the case in which an operation time of the turn signal switch exceeds a preset time (S437).

Further, whether the operation mode is a lane change mode or a turn mode is determined depending on a contact signal generated when the turn signal switch passes through a plurality of contacts (S410 and S420).

The method for controlling the turn signal may further include turning off the turn signal lamp when a first time elapses and the operation mode is the lane change mode (S415).

A first step of determining a course change direction is performed when the operation mode is the turn mode (S425).

A second step of determining whether the steering is operated in the reverse direction to the course change direction is performed after the first step of determining the course change direction is performed (S430).

The method for controlling the turn signal may further include determining whether the detected steering angle is equal to or more than the preset angle when the steering is operated in the reverse direction (S431) and turning off the turn signal lamp when the detected steering angle is equal to or more than the preset angle (S437).

The method for controlling the turn signal may further include determining whether a variation of the detected steering angle for a second time is changed to a first reference value or more when the steering is operated in the reverse direction (S433) and turning off the turn signal lamp when the variation of the detected steering angle is equal to or more than the first reference value (S437).

After determining whether the steering is operated in the reverse direction, whether the operation time of the turn signal switch exceeds a third time is determined (S435), and the turn signal lamp is turned off when the operation time of the turn signal switch exceeds the third time (S437).

The method for controlling the turn signal may further include determining whether the variation of a vehicle speed for a fourth time is equal to or more than a second reference value (S440) and turning on an emergency light when the variation of the vehicle speed is equal to or more than the second reference value (S460).

Whether the vehicle speed is equal to or less than a preset speed limit of a driving road is determined (S450), and the emergency light is turned on if it is determined that the vehicle speed is equal to or less than the preset speed limit of the driving road (S460).

According to the apparatus for controlling the turn signal having the above-mentioned configuration, it is possible to reduce volume of a package since the existing mechanical canceling cam is not required, and size of the canceling cam assembly needs not be changed according to an outer diameter size of a column shaft.

Further, it is possible to inform emergency situations to outside by automatically turning on and off turn signal lamps at both sides of a vehicle when a vehicle speed is suddenly reduced or the vehicle is driven at a low speed on an express highway by receiving vehicle speed and position information from a navigator.

Although the present inventive concept has been shown and described with respect to specific exemplary embodiments, it will be obvious to those skilled in the art that the present disclosure may be variously modified and altered without departing from the spirit and scope of the present disclosure as defined by the following claims.

What is claimed is:

1. An apparatus for controlling a turn signal, comprising:
a turn signal switch configured to include at least one of operation modes of a lane change mode and a turn mode;
a steering angle sensor configured to detect a steering angle of a vehicle; and
a controller configured to control the turn signal switch to turn on and off a turn signal lamp depending on an operation mode and to turn off the turn signal lamp in at least one of a case in which the steering angle, which returns in a reverse direction to a course change direction detected by the steering angle sensor, reaches a preset angle and a case in which an operation time of the turn signal switch exceeds a preset time,
wherein the controller determines the operation mode based on contact signals generated when the turn signal switch passes through a plurality of contacts,
wherein the controller determines the operation mode as any one of the lane change mode and the turn mode depending on a rising edge generated when the contact signal is not inputted initially and is then inputted and a falling edge generated when the contact signal is inputted initially and is then not inputted and a number of edges of the contact signals, and
wherein the contact signal is not inputted from a middle contact among the plurality of the contacts.

2. The apparatus of claim 1, wherein when the operation mode is the lane change mode, the controller turns off the turn signal lamp after a first time elapses.

3. The apparatus of claim 1, wherein when the operation mode is the turn mode, the controller is configured to determine the course change direction.

4. The apparatus of claim 3, wherein the controller is further configured to determine whether steering is operated in the reverse direction to the course change direction.

5. The apparatus of claim 4, wherein the controller is configured to determine whether the detected steering angle is equal to or more than a preset angle when the steering is operated in the reverse direction and to turn off the turn signal lamp when the detected steering angle is equal to or more than the preset angle.

6. The apparatus of claim 4, wherein the controller is configured to determine whether variation of the detected steering angle for a second time is changed to a first reference value or more when the steering is operated in the reverse direction and to turn off the turn signal lamp when the variation of a sensing value is equal to or more than the first reference value.

7. The apparatus of claim 4, wherein the controller is further configured to determine whether the operation time of the turn signal switch exceeds a third time and to turn off the turn signal lamp when the operation time of the turn signal switch exceeds the third time.

8. The apparatus of claim 1, wherein the controller is configured to determine whether variation of a vehicle speed for a fourth time is equal to or more than a second reference value and to turn on an emergency light when the variation of the vehicle speed is equal to or more than the second reference value.

9. The apparatus of claim 1, wherein the controller is configured to determine whether a vehicle speed is equal to or less than a preset speed limit of a driving road and to turn on an emergency light if it is determined that the vehicle speed is equal to or less than the preset speed limit, in which the preset speed limit of the driving road is based on information from a navigator.

* * * * *